United States Patent
MacInnis

(10) Patent No.: US 7,319,492 B2
(45) Date of Patent: Jan. 15, 2008

(54) OPEN LOOP SUBCARRIER SYNCHRONIZATION SYSTEM

(75) Inventor: Alexander G. MacInnis, Los Altos, CA (US)

(73) Assignee: Broadcom Corporation, Irvine, CA (US)

( * ) Notice: Subject to any disclaimer, the term of this patent is extended or adjusted under 35 U.S.C. 154(b) by 600 days.

(21) Appl. No.: 10/793,957

(22) Filed: Mar. 5, 2004

(65) Prior Publication Data

US 2004/0174460 A1    Sep. 9, 2004

Related U.S. Application Data

(60) Provisional application No. 60/452,229, filed on Mar. 5, 2003.

(51) Int. Cl.
*H03L 7/00* (2006.01)

(52) U.S. Cl. ............... 348/549; 348/537; 375/371; 370/516

(58) Field of Classification Search ........ 348/505–509, 348/514, 536, 537, 549, 441, 565, 567, 568, 348/584, 498; 370/503–519; 375/355–373
See application file for complete search history.

(56) References Cited

U.S. PATENT DOCUMENTS 5,784,118 A * 7/1998 Yamauchi et al. .......... 348/505
6,690,430 B1 * 2/2004 Takeshita ..................... 348/638

* cited by examiner

*Primary Examiner*—M. Lee
(74) *Attorney, Agent, or Firm*—McAndrews, Held & Malloy, Ltd.

(57) ABSTRACT

A system and method for synchronizing signals having respective sub-carriers in a signal processing system. Various aspects of the present invention may comprise method steps and structure that receive a sampled signal with an associated sub-carrier. Various aspects may determine a phase of the sub-carrier and store an indication of such phase. Various aspects may generate and store a cropped version of the sampled signal. Various aspects may also store an indication of which samples were cropped from the sampled signal. Various aspects may produce a synchronization signal based on the sampled signal. Various aspects may read a cropped version of a sampled signal and an associated indication of phase. Various aspects may generate a restored sampled signal by adding samples to the read cropped version. Various aspects may, based on the synchronization signal and indication of phase, output the restored sampled signal aligned with a second sampled signal.

37 Claims, 5 Drawing Sheets

OPEN LOOP SUBCARRIER SYNCHRONIZATION SYSTEM

CROSS-REFERENCE TO RELATED APPLICATIONS/INCORPORATION BY REFERENCE

This patent application claims the benefit of U.S. Provisional Application No. 60/452,229, filed Mar. 5, 2003, the contents of which are hereby incorporated herein by reference in their entirety.

FEDERALLY SPONSORED RESEARCH OR DEVELOPMENT

[Not Applicable]

SEQUENCE LISTING

[Not Applicable]

MICROFICHE/COPYRIGHT REFERENCE

[Not Applicable]

BACKGROUND OF THE INVENTION

Communication systems may utilize sub-carrier signals to carry communicated information. Digital communication systems may sample the sub-carrier signals prior to processing the information carried by the sub-carrier signals. Digital communication systems may perform a vast array of operations on received signals, including comparing and analyzing signals received at different instances in time.

For example, in the video communication field, a video signal processing system may analyze information in adjacent field or frame lines to determine various characteristics of the incoming video information. The video signal processing system may also compare corresponding field or frame lines in adjacent video fields or frames to determine various characteristics of the incoming video information. The video signal processing system may, for example, perform two-dimensional or three-dimensional comb filtering on an incoming video signal to determine chrominance and luminance information contained in the video signal. Such filtering may involve, for example, utilizing a plurality of field lines in a particular video field (i.e., two-dimensional comb filtering), and may additionally involve, for example, utilizing corresponding field lines in temporally separate video fields or frames (i.e., three-dimensional comb filtering).

It is often desirable, when processing signals received at different times, over different channels or over, for example, different media, to align the signals being processed. This alignment may generally be a temporal alignment, but may also be viewed, for example, as a phase alignment. For example, when processing two video field lines in an interlaced video stream, it may be desirable to align the phase (or timing) of the respective sub-carriers of the two video field lines. Such sub-carriers may also have been digitally sampled, in which case it may be desirable to align the corresponding digital data samples to sample and sub-sample accuracy.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and method are provided for synchronizing signals in a signal processing system. Various aspects of the present invention may comprise method steps and structure that receive a sampled sub-carrier signal. Various aspects may determine a phase of the sampled sub-carrier signal and store the indication of phase in memory. Various aspects may, for example, determine the phase of the sampled sub-carrier signal using a sub-carrier synthesizing phase lock loop.

Various aspects may generate and store a cropped version of a sampled sub-carrier modulated signal in memory. For example, various aspects may remove samples corresponding to non-active-video information from a signal including video information. Such samples to be removed may, for example, be predetermined or may be determined in real-time. Various aspects may also store in memory an indication of which samples were cropped from the sampled sub-carrier modulated signal to form the cropped version of the sampled sub-carrier modulated signal. Such memory may, for example, comprise field buffer memory or general DRAM.

Various aspects of the present invention may comprise method steps and structure that read a cropped version of a sampled sub-carrier modulated signal and an associated indication of sub-carrier phase from memory. Various aspects may also read from memory an indication of which samples were removed from the sampled sub-carrier modulated signal to form the cropped version of the sampled sub-carrier modulated signal. Various aspects may generate a restored sampled sub-carrier modulated signal by adding samples to the cropped version of the sampled sub-carrier modulated signal read from memory. Various aspects may, for example, insert samples in the cropped version of the sampled sub-carrier modulated signal read from memory according to the indication of which samples were removed from the sampled sub-carrier modulated signal to form the cropped version of the sampled sub-carrier modulated signal.

Various aspects of the present invention may comprise method steps and structure that produce a synchronization signal based on the sampled sub-carrier signal. Various aspects may, for example, utilize a sync processor to generate horizontal and vertical synchronization signals. Various aspects may also, for example, generate an indication of frame/field number or polarity. Various aspects may receive a second sampled sub-carrier. Various aspects may determine a phase of the second sampled sub-carrier. Various aspects may, based on, for example, the synchronization signal, the indication of phase read from memory and the phase of the second sampled sub-carrier, output the restored sampled sub-carrier modulated signal aligned with the second sampled sub-carrier modulated signal. Such alignment may be implemented with phase detection circuitry communicationally coupled to fractional sample delay circuitry.

These and other advantages, aspects and novel features of the present invention, as well as details of illustrative aspects thereof, will be more fully understood from the following description and drawings.

DETAILED DESCRIPTION OF THE INVENTION

Figure 1:
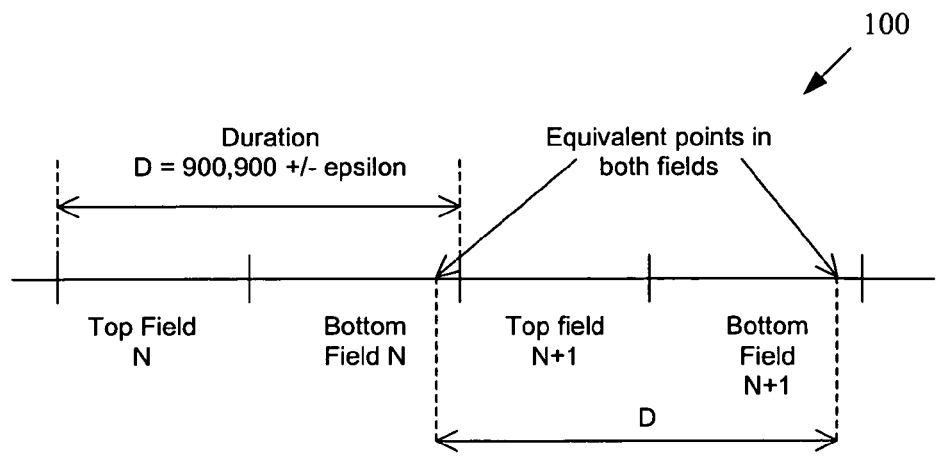
FIG. 1 is a diagram illustrating exemplary video frame interval timing.

FIG. 1 is a diagram 100 illustrating exemplary video frame interval timing. The illustrated example is a diagram for a typical interlaced video stream. The exemplary interlaced video stream includes an interlaced structure of top and bottom video field pairs. Each field, in turn, may include a plurality of video lines. Thus, Top Field N may include a plurality of video lines, and Bottom Field N may include a plurality of video lines, which when displayed, are interlaced with the video lines of Top Field N. Top Field N+1 may have a plurality of video lines that correspond spatially, but generally not temporally, with the plurality of video lines in Top Field N. Similarly, Bottom Field N+1 may have a plurality of video lines that correspond spatially, but generally not temporally, with the plurality of video lines in Bottom Field N.

A video signal processing system may, for example, process spatially corresponding video lines in temporally spaced video fields. For example, a video signal processing system may process line X of Bottom Field N and line X of Bottom Field N+1 simultaneously. The video signal processing system may, for example, add or subtract the corresponding lines. In such a signal-processing scenario, it may be desirable for the system to synchronize the sub-carrier that carries information of Bottom Field N, line X and the sub-carrier that carries information of Bottom Field N+1, line X. For example, the system may synchronize the sub-carriers by adjusting the timing (or phase) of one or more of the sub-carriers by adjusting the timing of one or more of the video signals.

Additionally, by the time the system performs such synchronization, the system may, for example, only have digital samples of originally analog video signals containing sub-carriers. If the sampling period is greater than the desired sub-carrier synchronization resolution, it may be desirable for the system to have the capability to synchronize the sampled sub-carriers with a resolution that is smaller than the period at which the original sub-carriers were sampled (i.e., perform fractional sample synchronization).

Note that though the example illustrated in FIG. 1 relates to a typical interlaced video stream, and the following discussion may present aspects of the present invention in the context of an interlaced video stream containing fields of video, the scope of the present invention should, by no means, be limited to interlaced video streams or the processing thereof.

Figure 2:
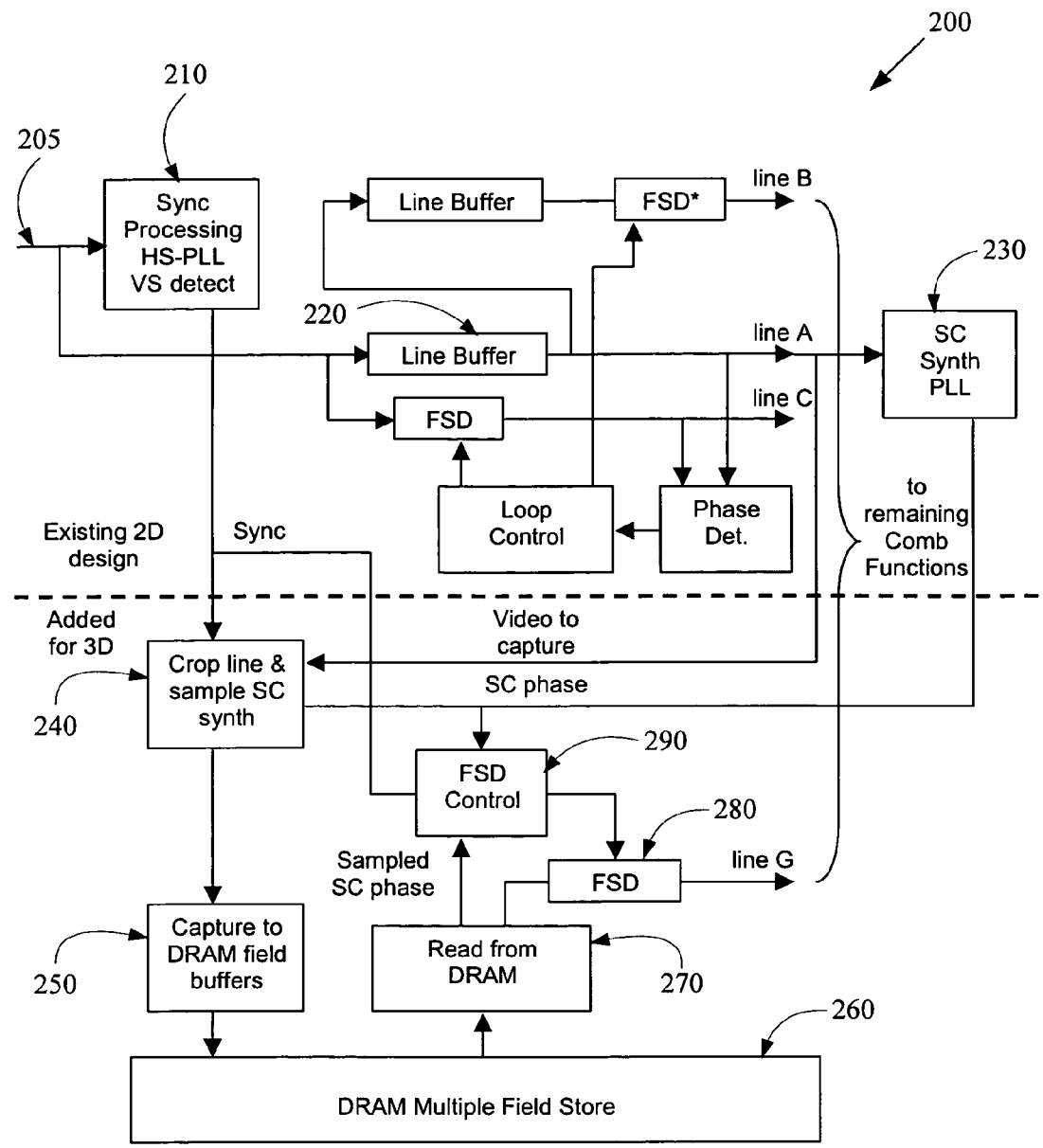
FIG. 2 is a diagram illustrating aspects of a system for synchronizing sub-carriers in accordance with various aspects of the present invention.

FIG. 2 is a diagram illustrating aspects of an exemplary system 200 for synchronizing sub-carriers in accordance with various aspects of the present invention. A sampled video signal carrying sub-carrier information arrives on the system video input line 205. The sync processor 210, which may include a horizontal sync phase lock loop (HS-PLL), extracts a horizontal sync signal from the sampled video signal and provides the horizontal sync signal to other system components. For example, system components may utilize the horizontal sync signal as a reference point from which to measure sub-carrier phase. The sync processor 210 may also generate and output signals corresponding to vertical synchronization and frame or field identification information.

The system video input line 205 provides the sampled video signal to a line buffer 220. The illustrated line buffer 220 and various other components of the system 200 are generally related to aspects of the exemplary system 200 involving two-dimensional comb filtering. The following discussion will generally refer to such components only when necessary. The line buffer 220 outputs the sampled video signal to a sub-carrier synthesizing phase lock loop (SC-Synth-PLL) circuit 230. The sampled video signal may include information of a sub-carrier burst signal. For example, standard NTSC video signals have such a sub-carrier burst signal. The SC-Synth-PLL 230 may internally regenerate a sub-carrier locked to such sub-carrier bursts in the sampled video signal. The SC-Synth-PLL 230, as part of its operation, may output a SC-phase signal (e.g., a digital differential analyzer, or DDA, value) that indicates the instantaneous phase of the internally generated sub-carrier and thus the instantaneous phase of the sampled sub-carrier signal.

The SC-Synth-PLL 230 is an exemplary device that outputs an indication of phase of the sub-carrier in the sampled video signal. Accordingly, the scope of various aspects of the present invention should, by no means, be limited to a SC-Synth-PLL device. For example, and without limitation, the SC-Synth-PLL may be replaced by other phase detecting circuits that accept a sampled signal and output an indication of phase of the sub-carrier of the sampled signal.

The system 200 may further include a line cropper and sampler 240. The line cropper and sampler 240 receives the sampled video signal from the line buffer 220 and receives the SC-phase signal from the SC-Synth-PLL 230. The line cropper and sampler 240 also receives as input the horizontal sync signal from the sync processor 210. The line cropper and sampler 240 may also receive, for example, vertical sync and frame/field identity information from the sync processor 210. The line cropper and sampler 240 may perform multiple tasks. For example, the line cropper and sampler 240 may crop (or delete) non-video information from a line of the sampled video signal, leaving only the active video samples of the sampled video signal. Since in this example, such non-video information is not necessary for future processing, the line cropper and sampler 240 may remove non-video information from the sampled video signal to conserve system resources. Alternatively, in systems utilizing non-video information for future processing, the line cropper and sampler 240 may not perform line cropping. Alternatively, the line cropper and sampler 240 may have the capability to adjust its cropping behavior in real-time according to various system stimuli.

The line cropper and sampler 240 may also, in synchronization with the horizontal sync signal, sample the SC-phase signal from the SC-Synth-PLL 230. The SC-phase signal, so sampled, may represent the phase of the sub-carrier of the sampled video signal at a consistent point in time relative to the horizontal sync signal.

The line cropper and sampler 240 may then output the cropped line of sampled video signal and the sampled SC-phase signal to a memory capture device 250. The memory capture device 250 may then, for example, manage storing the cropped line of sampled video signal and the sampled SC-phase signal for later use. Additionally, the line cropper and sampler 240 may also output an indication of which samples were cropped from the sampled video signal, which the memory capture device 250 may store.

Figure 3:
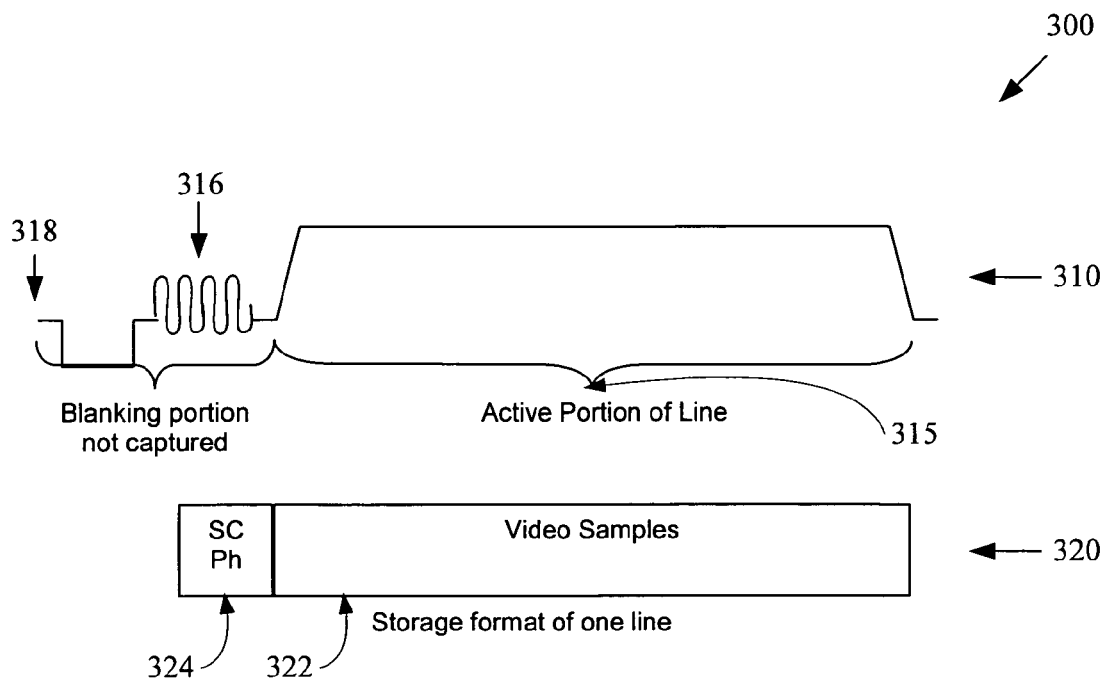
FIG. 3 is a diagram illustrating aspects of stored video sub-carrier samples and sub-carrier phase in accordance with various aspects of the present invention.

FIG. 3 is a diagram 300 illustrating aspects of stored video samples and sub-carrier phase in accordance with various aspects of the present invention. FIG. 3 shows an exemplary video signal line 310. The video signal line 310 includes an active video portion 315 that includes active video information. The video signal line 310 also includes a synchronization signal portion 316 and an "other information" portion 318. As explained above, if such synchronization signal and "other information" are not necessary for future processing, the line cropper and sampler 240 may crop such information to save system resources. This is illustrated by the exemplary one-line storage format 320 shown in FIG. 3. The length of the illustrated region 322 of the one-line storage format 320 dedicated to storing video samples coincides with the length of the active video portion 315 of the video signal line 310. Additionally, the storage format 320 includes a SC-phase region 324 for storing the sampled SC-phase signal.

The storage format 320 illustrated in FIG. 3 is an exemplary storage format. Accordingly, the illustrated exemplary storage format 320 should, by no means, limit the scope of various aspects of the present invention. For example, and without limitation, the SC-phase region 324 and video sample storage region 322 may be separated into different memory blocks and different memory types. Also, for example, the storage format 320 may include a variety of additional information, such as an indication of which samples were cropped from the sampled video signal to form the stored cropped version of the sampled video signal.

Referring back to FIG. 2, the memory capture device 250 may store the cropped line of sampled video signal and the sampled SC-phase signal in a memory 260. The memory 260 may include, for example, a Dynamic Random Access Memory (DRAM) device. The memory capture device 250 may, for example, store the cropped line of sampled video signal and the sampled SC-phase signal in the memory 260 according to the one-line storage format 320 shown in FIG. 3. The DRAM Multiple Field Store 260 illustrated in FIG. 2 is an illustrative memory example and should, by no means, limit the scope of various aspects of the present invention. For example, the memory 260 may include static or dynamic memory, volatile or non-volatile memory, or other circuits capable of data retention. The memory 260 may include general memory elements or memory elements specifically designed, for example, for storing fields of video information.

At this point in the example, the memory 260 has stored in it the cropped line of sampled video signal and the corresponding sampled SC-phase. Operation of the system may, for example, generally provide for at least two entire fields (i.e., an entire video frame) of such video line information to be stored in the memory 260. Accordingly, when a current sampled video signal arrives at the system video input line 205 carrying information of a current video line in a current video frame, the memory 260 may have stored in it a cropped line of sampled video and phase of a sampled sub-carrier signal from the previous video frame that corresponds spatially to the current video line.

The system 200 may then restore the cropped line of sampled video signal corresponding to the current sampled video signal and output the restored signal synchronized to the current signal. To accomplish this, the memory read block 270 may read out from the memory device 260 the cropped line of sampled video and associated sub-carrier phase that correspond to the current video line. The memory read block 270 may then restore portions of the cropped line of sampled video that were cropped by the line cropper and sampler 240. The memory read block 270 may, for example, restore portions of the cropped line of sampled video by inserting null samples in the cropped line of sampled video in place of the previously cropped samples. The restored line of sampled video will be referred to in the following discussion as the "prior-frame sampled video." The memory read block 270 may then output the prior-frame sampled video to the Fractional Sample Delay (FSD) circuit 280.

The memory read block 270 may also output the sub-carrier phase of the cropped line of sampled video (now restored) to the FSD Control circuit 290. For the following discussion, the sub-carrier phase of the restored line of sampled video will be referred to as the "prior-frame sampled sub-carrier phase."

The FSD control circuit 290 may also receive as input the SC-phase signal from the SC-Synth-PLL 230. The SC-phase signal from the SC-Synth-PLL 230 corresponds to the instantaneous phase of the sub-carrier of the current sampled video signal. The FSD control circuit 290 may further receive the horizontal sync signal from the sync processor 210. The FSD control circuit 290 may sample the SC-phase signal according to the horizontal sync signal. This synchronized sampling may temporally coordinate samples of the current sampled sub-carrier phase with the prior-frame sampled sub-carrier phase. This temporal sample coordination may help provide for an accurate phase comparison of the sampled phase signals. The FSD control circuit 290 may then determine a phase difference between the current sampled sub-carrier phase and the prior-frame sampled sub-carrier phase.

The FSD control circuit 290 may determine a timing adjustment, which may also be referred to herein as a "phase adjustment," to make to the prior-frame sampled video signal to synchronize the sub-carrier of the prior-frame sampled video signal to the sub-carrier of the current sampled video signal. The FSD control circuit 290 may output a timing-adjustment signal to the FSD circuit 280 to initiate the desired timing adjustment. The FSD circuit 280 may respond to the timing adjustment signal from the FSD control circuit 290 by temporally shifting the prior-frame sampled video signal a number of fractional samples corresponding to the timing-adjustment signal. For timing adjustments to the prior-frame sampled video signal that are greater than or equal to an entire sample period, the FSD circuit 280 may, for example, add a whole sample to, or delete a whole sample from, the prior-frame sampled video signal. The FSD circuit 280 may then output the prior-frame sampled video signal on line G synchronized to the sub-carrier of the current sampled video signal output from the line buffer 220 on line A.

In the exemplary system 200 illustrated in FIG. 2, the system 200 is generally preparing signals for processing by a subsequent comb filter module. However, in no way, are various aspects of the present invention limited to preparing signals for subsequent comb filtering or any other specific signal processing function.

Figure 4:
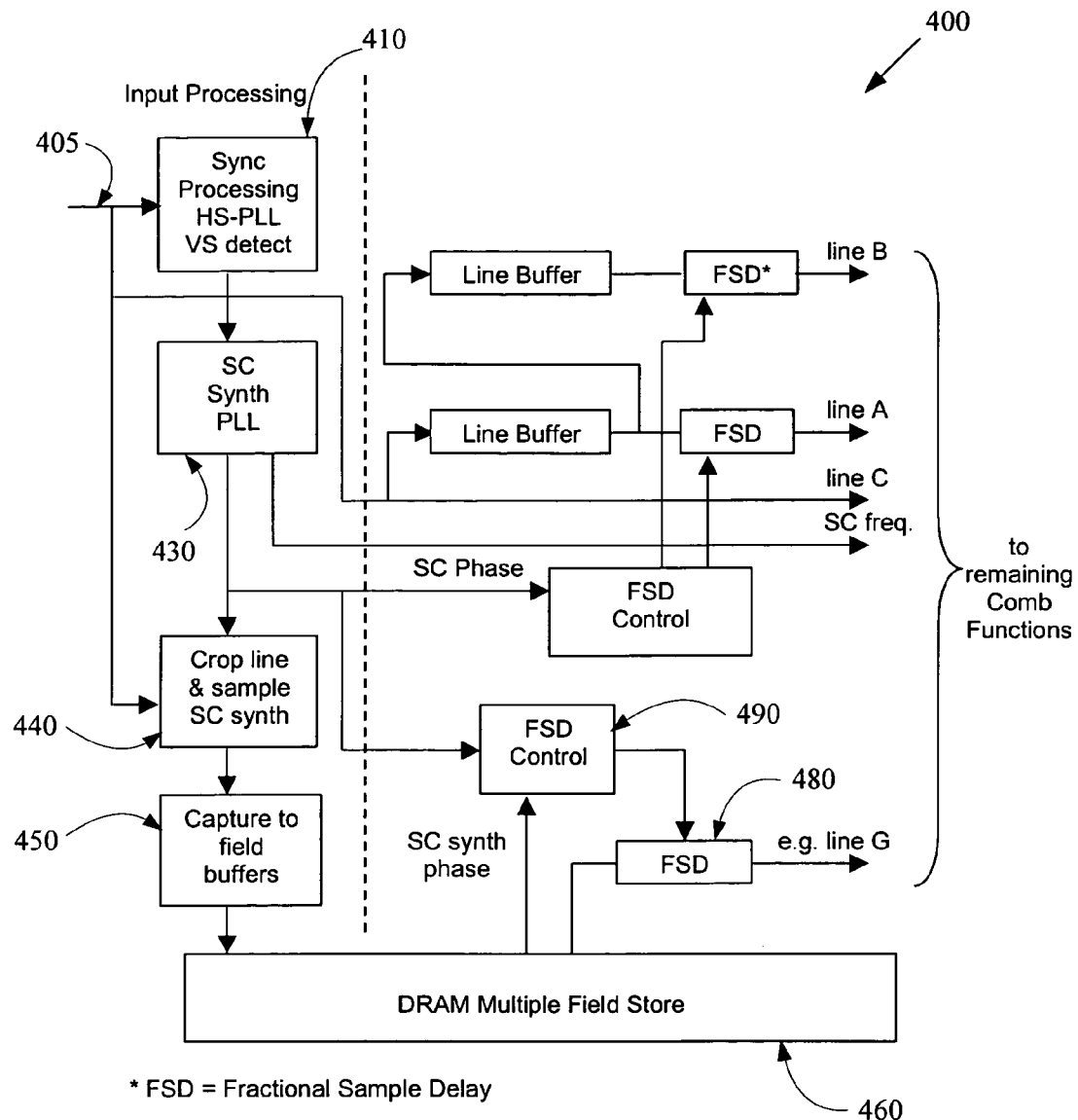
FIG. 4 is a diagram illustrating aspects of an alternative system for synchronizing sub-carriers in accordance with various aspects of the present invention.

FIG. 4 is a diagram illustrating aspects of an alternative system 400 for synchronizing sub-carriers in accordance with various aspects of the present invention. Various aspects of the alternative system 400 illustrated in FIG. 4 are similar to various aspects of the exemplary system 200 illustrated in FIG. 2. The following discussion will address some of the differences between the two exemplary systems.

The alternative system 400 may receive a sampled video signal carrying sub-carrier information on the system video input line 405. The sync processor 410 receives the sampled video signal and extracts the horizontal sync signal from the sampled video signal. The sync processor 410 may provide the extracted horizontal sync signal to various system components for use in synchronization (e.g., for use as a reference for phase determinations). The sync processor 410 may also provide vertical sync and frame/field identity information to various system components for use in synchronization.

The sync processor 410 provides the horizontal sync signal to the SC-Synth-PLL circuit 430. The SC-Synth-PLL 430 may also receive the sampled sub-carrier from the sampled video. The SC-Synth-PLL 430 may receive such signals from the video input line 405 or, for example, from the sync processor 410. The SC-Synth-PLL 430 may internally generate a sub-carrier locked to such sampled sub-carrier. The SC-Synth-PLL 430 may output the generated sub-carrier and may also output the instantaneous phase of the generated sub-carrier.

The alternative system 400 may also include a line cropper and sampler 440 coupled to the SC-Synth-PLL 430. The line cropper and sampler 440 may synchronize according to an SC-phase signal from the SC-Synth-PLL 430, or may, for example, receive a synchronization signal from the sync processor 410. The line cropper and sampler 440 may, for example, function similarly to the line cropper and sampler 240 discussed with regard to FIG. 2. The line cropper and sampler 440 may receive and sample the SC-phase indication from the SC-Synth-PLL 430 and may receive and crop the sampled video signal from the video input line 405.

The alternative system 400 may further include a field capture block 450 that receives cropped line and phase sample information from the line cropper and sampler 440. The field capture block 450 may then format the cropped line and phase sample information in a predetermined format, such as the storage format 320 shown in FIG. 3. The field capture block 450 may then manage storing the formatted cropped line and phase sample information in a memory 460.

Similar to the system 200 discussed with regard to FIG. 2, the alternative system 400 memory 460 may have stored in it cropped line and phase information for one or more entire video frames. Accordingly, when a current sampled video signal arrives at the video input line 405 carrying information of a current video line in a current video frame, the memory 460 may have stored in it a cropped line (and corresponding sub-carrier phase) corresponding to the current video line but from a previous video frame.

The alternative system 400 may then restore the cropped line of sampled video signal corresponding to the current video signal and output the restored signal synchronized to the sub-carrier of the current signal. To accomplish this, the memory 460 may retrieve the corresponding cropped line of sampled video signal and output the cropped line of sampled video signal to a FSD circuit 480. The memory 460 or the FSD circuit 480 may, for example, include circuitry to restore samples to the cropped line of sampled video signal that were cropped by the line cropper and sampler 440.

The alternative system 400 may include a FSD control circuit 490 that receives phase information from the SC-Synth-PLL 430. The FSD control circuit 490 may also, for example, receive horizontal sync information from the sync processor 410. The FSD control circuit 490 may receive phase information for the cropped line of sampled video from the memory 460. The FSD control circuit 490, using information of the sub-carrier phase of the current sampled video signal and the sub-carrier phase of the cropped line of sampled video signal, may determine a timing (or phase) adjustment necessary to synchronize the cropped line of sampled video signal (or the restored version thereof) with the current sampled video signal, according to their respective sub-carriers. The FSD control circuit 490 may then generate a timing adjustment signal based on the determined timing adjustment and output the timing adjustment signal to the FSD circuit 480.

The FSD circuit 480 may then respond to the timing adjustment signal from the FSD control circuit 490 by temporally shifting the restored sampled video signal a number of fractional samples corresponding to the timing adjustment signal. For timing adjustments to the restored sampled video signal that are greater than or equal to an entire sample period, the FSD circuit 480 may, for example, add whole samples to or delete whole samples from the restored sampled video signal. The FSD circuit 480 then outputs the restored sampled video signal on line G synchronized to the current sampled video on line C.

In the exemplary alternative system 400 illustrated in FIG. 4, the system 400 is generally preparing signals for processing by a subsequent comb filter module. However, in no way, are various aspects of the present invention limited to preparing signals for comb filtering or any other subsequent signal processing function. Additionally, various aspects of the exemplary systems have been addressed and explained in a video signal context. However, in no way are various aspects of the present invention limited to video signal processing. Further, as illustrated by the exemplary systems in FIGS. 2 and 4, a variety of system configurations are possible that incorporate various aspects of the present invention. Accordingly, the various aspects of the present invention should, by no means, be limited to a particular system configuration.

Figure 5:
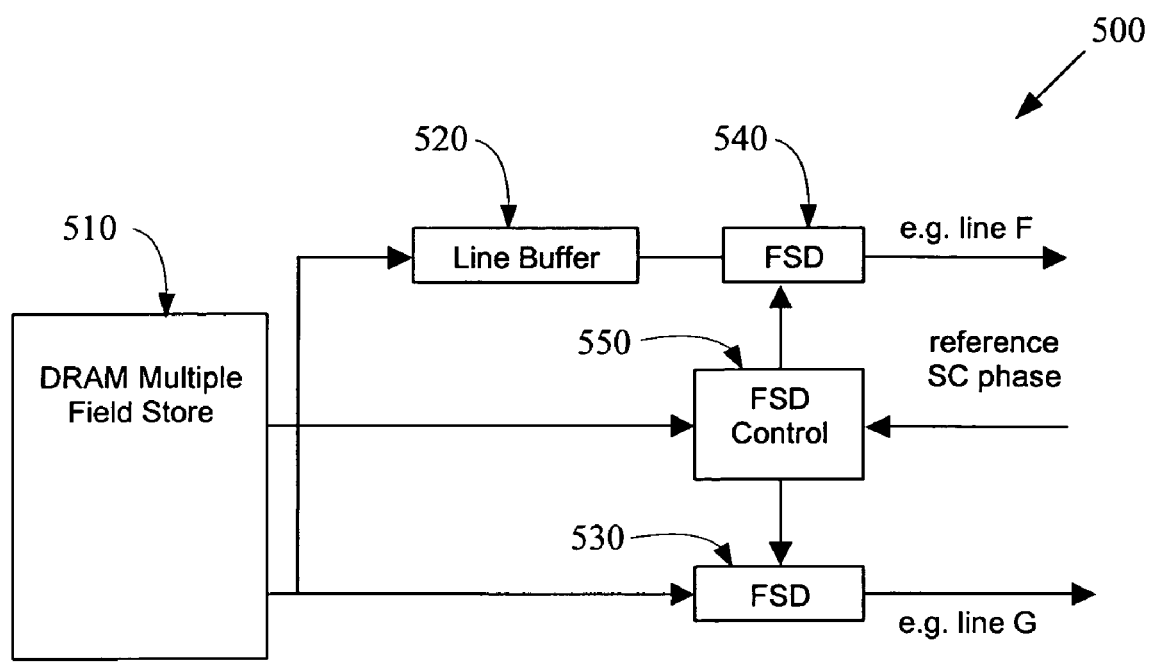
FIG. 5 is a diagram illustrating aspects of a system for synchronizing multiple stored sub-carriers in accordance with various aspects of the present invention.

FIG. 5 is a diagram illustrating aspects of an exemplary system 500 for synchronizing multiple stored video signals in accordance with various aspects of the present invention. The system 500 includes a memory 510, which may include, for example, a DRAM. The memory 510 may, for example, store sampled video signal information and corresponding sub-carrier phase information for one or more entire video fields.

The memory 510 may provide stored sampled video signal information to multiple system components. For example, the memory 510 may provide stored sampled video signal information to a line buffer 520 for timing purposes. The memory 520 may also provide stored sampled video signal information directly to a first FSD circuit 530. The stored sampled video signal information provided to various system components by the memory 510 may, for example, include information of a single video line or multiple video lines, or it may, for example, include information of one video field or multiple video fields.

The line buffer 520 may provide buffered sampled video signal information to a second FSD circuit 540. The memory 510 may provide stored sampled sub-carrier phase information to a FSD control circuit 550. The stored sampled sub-carrier phase information may, for example, include phase information for the sub-carriers from multiple stored sampled video signals or a single stored sampled video signal.

The FSD control circuit 550 may also receive one or more reference phase indications. The FSD control circuit 550 may then utilize the reference phase indication(s) and the stored sampled sub-carrier phase information received from the memory 510 to determine respective timing (or phase) adjustments for the first FSD circuit 530 and second FSD circuit 540. The FSD control circuit 550 may then output respective timing adjustment signals to the first FSD circuit 530 and second FSD circuit 540, when may then adjust the timing of the sub-carriers of their respective sampled video signals accordingly. The first 530 and second 540 FSD circuits may then output the timing-adjusted sampled video signals on respective output lines.

The system 500 illustrated in FIG. 5 is but one exemplary system presented to illustrate the extensibility of various aspects of the present invention to systems utilizing multiple stored sampled signals with sub-carriers simultaneously. Accordingly, various aspects of the system 500 should, by no means, limit the scope of various aspects of the present invention. For example, and without limitation, though the previous discussion refers to a sampled video signal and video signal sub-carrier, the video signal may alternatively be a signal carrying non-video information.

Figure 6:
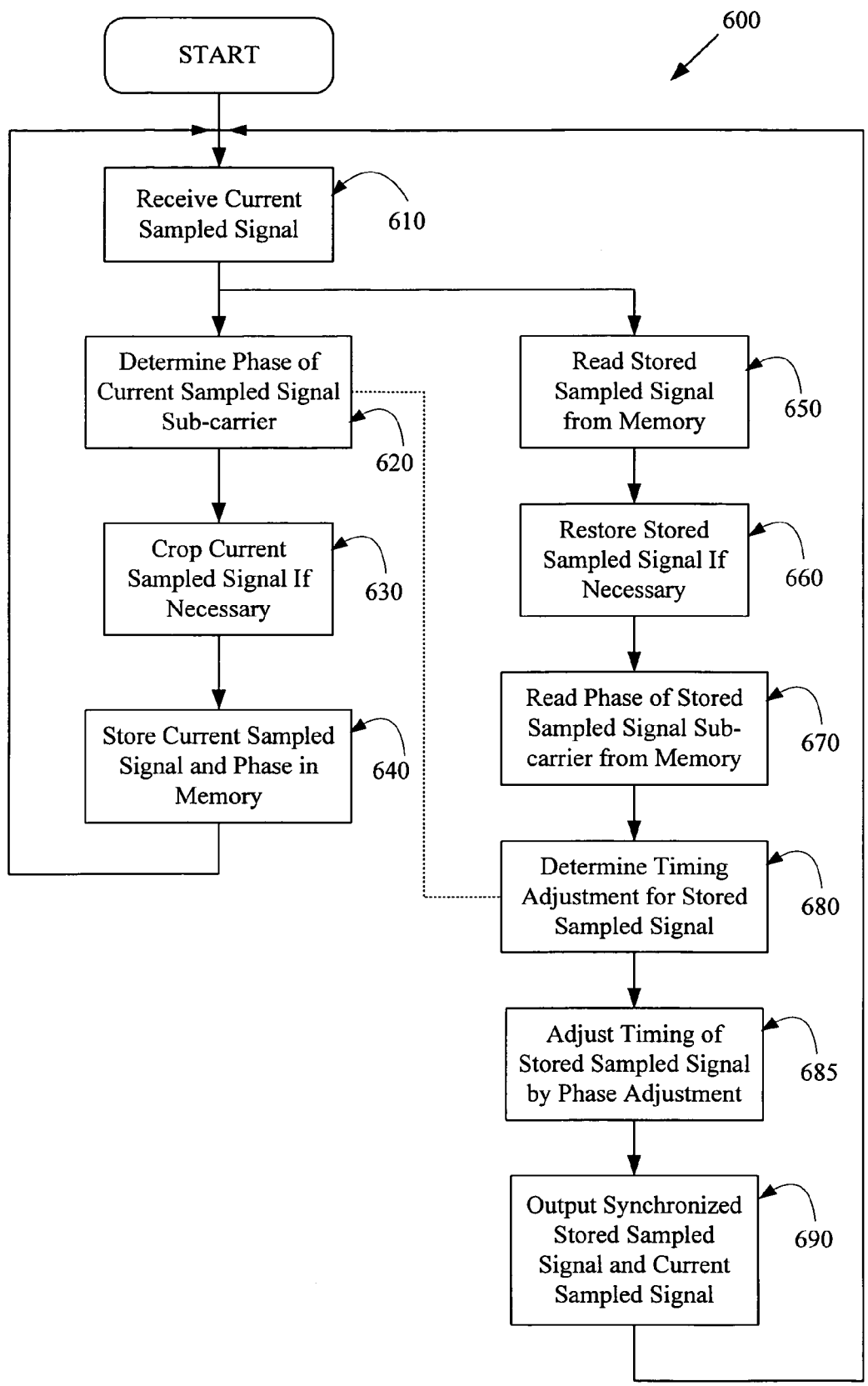
FIG. 6 is a diagram illustrating aspects of a method for synchronizing sub-carriers in accordance with various aspects of the present invention.

FIG. 6 illustrates an exemplary method 600 for synchronizing sub-carriers in a signal processing system. The sub-carriers, for example and without limitation, may be used in the modulation of video information. The sub-carriers may further, for example, be used for modulating video information for corresponding video lines in different video fields.

The method 600 includes receiving a current sampled video signal at step 610. The method 600 then includes determining a phase of the sub-carrier of the current sampled video signal at step 620. Step 620 may include, for example, determining the phase of the current sampled video signal sub-carrier utilizing a sub-carrier synthesizing phase lock loop. For example, step 620 may include generating a sub-carrier locked to a sub-carrier burst signal in the current sampled video signal. Step 620 may then include determining the phase of the generated sub-carrier at a particular reference point in time. Step 620 may determine the particular reference point in time by utilizing other system signals, for example, a horizontal sync signal in a video signal processing system. Alternatively, step 620 may include utilizing a variety of known phase-determining methods and apparatus.

The method 600 then may then crop the current sampled video signal to remove unnecessary information at step 630. The method 600 may perform the cropping step 630, for example, to conserve memory resources. Step 630 may be optional. Step 630 may include removing information from the current sampled video signal that a subsequent signal processing system does not need. For example, in a video signal processing system, the cropping step 630 may remove various synchronization signal components of the current sampled video signal, or may remove data information contained in horizontal or vertical blanking intervals.

The method 600 may then store the cropped (or non-cropped) current sampled video signal and the phase of the current sampled sub-carrier in memory at step 640. Step 640 may include, for example, storing the sampled video signal and corresponding sub-carrier phase in a dynamic random access memory device. Alternatively, the sampled video signal storing step 640 may include, for example, storing the sampled video signal and corresponding sub-carrier phase in volatile or non-volatile memory, in on-board or off-board memory, in integrated or non-integrated memory, or in any compatible data retention device.

The method 600 also includes reading a stored sampled video signal from memory at step 650. The stored sampled video signal may, for example, contain information corresponding to the information contained in the current sampled video signal. For example, if the current sampled video signal contains information from a current video line in a current video frame, the stored sampled video signal may contain information from a video line corresponding to the current video line, but in a previous video frame. Alternatively, for example, the stored sampled signal may contain any information that a subsequent signal processing system may desire to receive in a synchronized manner with the information in the current sampled signal.

The method 600 may then restore the stored sampled video signal if, for example, the stored sampled video signal had been cropped prior to storage, at step 660. For example, the restoring step 660 may include replacing omitted data sections in the stored sampled video signal with null data samples. The method 600 may perform step 660, for example, for signal timing reasons.

The method 600 may read the stored phase of the sub-carrier of the stored sampled video signal from memory at step 670. The stored phase may, for example, be located in the same data structure as the stored sampled video signal. The stored phase may alternatively, for example, be stored in a data structure linked to a corresponding data structure containing the stored sampled video signal. The stored phase may alternatively, for example, be stored in a data structure indexed in a manner corresponding to a data structure containing the stored sampled video signal. The stored phase may, for example, be stored in the same memory device as the corresponding stored sample video signal or in separate memory devices.

The method 600 may then determine a timing (or phase) adjustment for the stored sampled video signal to synchronize the stored sampled video signal to the current sampled video signal, the timing adjustment utilizing the phase information associated with the sub-carriers in the various signals at step 680. For example, the step 680 may determine the timing adjustment by comparing the stored phase of the sub-carrier of the stored sampled video signal to the results of the phase determining step 620. This is indicated by the dashed line in FIG. 6.

The method 600 may then adjust the timing (or phase) of the stored sampled video signal by the determined timing adjustment to synchronize the stored sampled video to the current sampled video signal at step 685. Step 685 may include, for example, temporally shifting the stored sampled video signal by whole sample periods or fractional sample periods.

The method 600 may then output the current sampled video signal and the stored sampled video signal synchronized to the sub-carrier of the current sampled video signal at step 690. The method 600 may perform step 690, for example, when a subsequent signal processing system processes the current sampled video signal and the stored sampled video signal in a manner requiring such synchronization.

The method 600 as discussed previously and illustrated in FIG. 6 is an exemplary method 600 presented to develop a fundamental understanding of various aspects of the present invention. The method 600 is readily extensible to many signal processing scenarios, for example, multi-carrier systems, video systems, audio systems, audio/video systems and signal processing systems in general.

In summary, various aspects of the present invention provide a system and method for synchronizing signals in a signal processing system.

While the invention has been described with reference to certain aspects and embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A system for synchronizing a first sampled signal with an associated sub-carrier having a first sub-carrier phase and a second sampled signal with an associated sub-carrier having a second sub-carrier phase, the system comprising:
   a first logic circuit storing the first sampled signal and the first sub-carrier phase;
   a second logic circuit communicatively coupled to the first logic circuit, the second logic circuit receiving as inputs the first sub-carrier phase from the first logic circuit and the second sub-carrier phase, the second logic circuit outputting an indication of phase difference between the first sub-carrier phase and the second sub-carrier phase;
   a third logic circuit communicatively coupled to the first logic circuit and the second logic circuit, the third logic circuit receiving the first sampled signal from the first logic circuit and the indication of phase difference from the second logic circuit, the third logic circuit outputting the first sampled signal time-shifted according to the indication of phase difference.

2. The system of claim 1, wherein the first logic circuit comprises a dynamic random access memory circuit.

3. The system of claim 1, wherein the third logic circuit comprises a fractional sample delay circuit.

4. The system of claim 1, further comprising a fourth logic circuit communicatively coupled to the second logic circuit, the fourth logic circuit receiving as input the second sampled signal and outputting the second sub-carrier phase to the second logic circuit.

5. The system of claim 4, wherein the fourth logic circuit comprises a sub-carrier synthesizing phase lock loop.

6. The system of claim 1, further comprising a fourth logic circuit communicatively coupled to the first logic circuit, the fourth logic circuit receiving as input the first sampled signal and outputting an indication of the first sub-carrier phase to the first logic circuit.

7. The system of claim 6, wherein the fourth logic circuit comprises a phase detecting circuit and a sampling circuit.

8. The system of claim 1, wherein the first sampled signal carries information for a line of video, the system further comprising a fourth logic circuit communicatively coupled to the second logic circuit, the fourth logic circuit receiving the first sampled signal as input and outputting an indication of horizontal synchronization to the second logic circuit.

9. The system of claim 1, further comprising a fourth logic circuit communicatively coupled to the first logic circuit that receives as input the first sampled signal and outputs a cropped version of the first sampled signal to the first logic circuit.

10. The system of claim 9, further comprising a fifth logic circuit communicatively coupled to the first logic circuit and the third logic circuit, the fifth logic circuit receiving as input the cropped version of the first sampled signal from the first logic circuit and outputting a restored version of the first sampled signal to the third logic circuit, the restored version of the first sampled signal comprising the cropped version of the first sampled signal received from the first logic circuit and additional samples to fill in at least a portion of the first sampled signal cropped by the fourth logic circuit.

11. A method for synchronizing a first sampled signal with an associated sub-carrier having a first sub-carrier phase and a second sampled signal with an associated sub-carrier having a second sub-carrier phase, the method comprising:
   receiving the first sampled signal from a memory device;
   receiving information indicating the first sub-carrier phase from a memory device;
   determining a phase difference between the first sub-carrier phase of the sub-carrier associated with the first sampled signal and the second sub-carrier phase of the sub-carrier associated with the second sampled signal; and
   adjusting timing of at least one of the first sampled signal and the second sampled signal based on the determined phase difference.

12. The method of claim 11, wherein adjusting timing comprises delaying at least one of the first sampled signal and the second sampled signal by a fractional sample.

13. The method of claim 11, further comprising:
   determining the first sub-carrier phase; and
   storing the first sampled signal and first sub-carrier phase in memory.

14. The method of claim 11, wherein the first sampled signal carries information of a video line in a first video frame of a video stream and the second sampled signal carries information of a video line in a second video frame of the video stream, the video line in the first video frame corresponding spatially to the video line in the second video frame.

15. A method for synchronizing a first sampled signal with an associated sub-carrier having a first sub-carrier phase and a second sampled signal with an associated sub-carrier having a second sub-carrier phase, the method comprising:
   receiving the first sampled signal;
   determining the first sub-carrier phase;
   cropping the first sampled signal to form a cropped version of the first sampled signal;
   storing the cropped version of the first sampled signal and the first sub-carrier phase in memory;
   determining a phase difference between the first sub-carrier phase and the second sub-carrier phase; and
   adjusting timing of at least one of a version of the first sampled signal and/or the second sampled signal based, at least in part, on the determined phase difference.

16. The method of claim 15, further comprising restoring the first sampled signal by inserting samples in at least a portion of the first sampled signal that was cropped to form the cropped version of the first sampled signal.

17. The method of claim 15, further comprising, prior to determining a phase difference between the first sub-carrier phase and the second sub-carrier phase, retrieving the stored first sub-carrier phase from storage.

18. A method for synchronizing a first sampled signal with an associated sub-carrier having a first sub-carrier phase and a second sampled signal with an associated sub-carrier having a second sub-carrier phase, the method comprising:
receiving a first sampled signal;
determining the first sub-carrier phase;
storing the first sampled signal and the first sub-carrier phase in memory;
receiving a second sampled signal;
determining the second sub-carrier phase;
reading the first sub-carrier phase from memory;
determining a timing adjustment by comparing the second sub-carrier phase with the first sub-carrier phase read from memory;
reading the first sampled signal from memory; and
aligning the first sampled signal read from memory and the second sampled signal by adjusting the timing of at least one of the first sampled signal read from memory and/or the second sampled signal based on the determined timing adjustment.

19. The method of claim 18, wherein determining the first sub-carrier phase comprises determining the phase of the sub-carrier associated with the first sampled signal using a sub-carrier-synthesizing phase lock loop.

20. The method of claim 19, wherein determining the first sub-carrier phase further comprises sampling the output of the sub-carrier-synthesizing phase lock loop.

21. The method of claim 18, wherein:
determining the first sub-carrier phase comprises determining the phase of the sub-carrier associated with the first sampled signal with a phase detecting circuit; and
determining the second sub-carrier phase comprises determining the phase of the sub-carrier associated with the second sampled signal with the phase detecting circuit.

22. The method of claim 18, wherein the first sampled signal and the second sampled signal comprise information of corresponding television field lines.

23. The method of claim 22, further comprising cropping the first sampled signal to remove at least a portion of non-video information prior to storing the first sampled signal in memory.

24. The method of claim 23, further comprising restoring the first sampled signal read from memory by inserting samples in at least a portion of the first sampled signal that was cropped prior to storing the first sampled signal in memory.

25. The method of claim 18, wherein adjusting the timing comprises adjusting the timing of the first sampled signal read from memory by fractional samples.

26. The method of claim 15, further comprising forming a restored version of the first sampled signal based, at least in part, on the stored cropped version of the first sampled signal.

27. The method of claim 26, wherein adjusting timing of at least one of a version of the first sampled signal and/or the second sampled signal based, at least in part, on the determined phase difference comprises adjusting timing of the restored version of the first sampled signal based, at least in part, on the determined phase difference.

28. A system for synchronizing a first sampled signal with an associated sub-carrier having a first sub-carrier phase and a second sampled signal with an associated sub-carrier having a second sub-carrier phase, the system comprising:
at least one logic circuit that operates to, at least:
receive the first sampled signal;
determine the first sub-carrier phase;
crop the first sampled signal to form a cropped version of the first sampled signal;
store the cropped version of the first sampled signal and the first sub-carrier phase in memory;
determine a phase difference between the first sub-carrier phase and the second sub-carrier phase; and
adjust timing of at least one of a version of the first sampled signal and/or the second sampled signal based, at least in part, on the determined phase difference.

29. The system of claim 28, wherein the at least one logic circuit operates to restore the first sampled signal by inserting samples in at least a portion of the first sampled signal that was cropped to form the cropped version of the first sampled signal.

30. The system of claim 28, wherein the at least one logic circuit operates to, prior to determining a phase difference between the first sub-carrier phase and the second sub-carrier phase, retrieve the stored first sub-carrier phase from storage.

31. The system of claim 28, wherein the at least one logic circuit operates to form a restored version of the first sampled signal based, at least in part, on the stored cropped version of the first sampled signal.

32. The method of claim 31, wherein the at least one logic circuit operates to adjust timing of at least one of a version of the first sampled signal and/or the second sampled signal based, at least in part, on the determined phase difference by, at least in part, adjusting timing of the restored version of the first sampled signal based, at least in part, on the determined phase difference.

33. A system for synchronizing a first sampled signal with an associated sub-carrier having a first sub-carrier phase and a second sampled signal with an associated sub-carrier having a second sub-carrier phase, the system comprising:
at least one logic circuit that operates to:
receive a first sampled signal;
determine the first sub-carrier phase;
store the first sampled signal and the first sub-carrier phase in memory;
receive a second sampled signal;
determine the second sub-carrier phase;
read the first sub-carrier phase from memory;
determine a timing adjustment by comparing the second sub-carrier phase with the first sub-carrier phase read from memory;
read the first sampled signal from memory; and
align the first sampled signal read from memory and the second sampled signal by adjusting the timing of at least one of the first sampled signal read from memory and/or the second sampled signal based on the determined timing adjustment.

34. The system of claim 33, wherein the at least one logic circuit comprises a sub-carrier-synthesizing phase lock loop, and operates to determine the first sub-carrier phase by, at least in part, determining the phase of the sub-carrier associated with the first sampled signal using the sub-carrier-synthesizing phase lock loop.

35. The system of claim 33, wherein:
the at least one logic circuit comprises a phase detecting circuit;
the at least one logic circuit operates to determine the first sub-carrier phase by, at least in part, determining the phase of the sub-carrier associated with the first sampled signal using the phase detecting circuit; and the at least one logic circuit operates to determining the second sub-carrier phase by, at least in part, determining the phase of the sub-carrier associated with the second sampled signal using the phase detecting circuit.

36. The system of claim 33, wherein the first sampled signal and the second sampled signal comprise information of corresponding television field lines.

37. The system of claim 33, wherein the at least one logic circuit comprises a fractional sample delay circuit and operates to adjust the timing of at least one of the first sampled signal read from memory and/or the second sampled signal by fractional samples using the fractional sample delay circuit.

* * * * *